United States Patent [19]
Hernandez

[11] Patent Number: 5,825,657
[45] Date of Patent: Oct. 20, 1998

[54] DYNAMIC, NON-UNIFORM CLOCK FOR RESAMPLING AND PROCESSING MACHINE SIGNALS

[75] Inventor: Walter C. Hernandez, Potomac, Md.

[73] Assignee: Monitoring Technology Corporation, Fairfax, Va.

[21] Appl. No.: 606,431

[22] Filed: Feb. 23, 1996

[51] Int. Cl.$^6$ .............................. G01M 7/00; G01R 29/02
[52] U.S. Cl. .......................... 364/486; 364/487; 364/508; 364/576
[58] Field of Search ...................................... 364/486, 508, 364/487, 507, 506, 576; 73/593, 660, 460

[56] References Cited

U.S. PATENT DOCUMENTS

| | | | |
|---|---|---|---|
| 4,488,240 | 12/1984 | Kapadia et al. | 364/508 |
| 4,931,949 | 6/1990 | Hernandez et al. | 364/497 |
| 5,365,787 | 11/1994 | Hernandez et al. | 73/660 |
| 5,412,985 | 5/1995 | Garcia et al. | 73/460 |
| 5,445,028 | 8/1995 | Bianchi et al. | 73/593 |
| 5,501,105 | 3/1996 | Hernandez et al. | 73/660 |
| 5,511,422 | 4/1996 | Hernandez | 73/593 |

OTHER PUBLICATIONS

Dr. George P. Succi, Synchronous Averaging of Multiple Gear Shafts Using an Interpolating Filter, (13 pages).

Primary Examiner—James P. Trammell
Assistant Examiner—Demetra R. Smith
Attorney, Agent, or Firm—Woodbridge & Associates, P.C.

[57] ABSTRACT

A method and device for processing quasi-periodic signals from machines that provides improved diagnostic results. A dynamic, non-uniform signal termed the speed clock controls processing of the signals. This processing prevents the leakage artifacts and poor frequency resolution that can mask signal components and limit the diagnostic value of existing technology. Valuable phase information, which is destroyed by existing sampling methods controlled directly by encoder signals, is retained. The invention also enables removal of large masking signal components without otherwise altering the signal. By preventing artifacts, retaining phase information, and removing undesirable signal components, the present invention is a dramatic improvement over existing technology for processing signals to determine the health and performance of operating machines.

24 Claims, 10 Drawing Sheets

DYNAMIC, NON-UNIFORM CLOCK FOR RESAMPLING AND PROCESSING MACHINE SIGNALS

BACKGROUND OF THE INVENTION

1. Field of the Invention

The present invention relates to a digital signal processing method and device to monitor the condition and performance of operating machines.

2. Related Art

Vibration monitoring is used widely to determine the condition of operating machinery and provide information for maintenance planning decisions. Since the advent in the 1960's of Fast Fourier Transformation (FFT) for processing periodic signals, machine vibrations have been subject increasingly to spectral analysis. Many complex systems, such as a helicopter drive train, generate complex, high energy vibration signals. In such instances, Fourier-based analysis has met with only limited success even when sensors are placed in close proximity to the component of monitoring interest. The complexity of vibration analysis and difficulty in placing sensors in complex machines led to the present invention.

U.S. Pat. No. 4,931,949, assigned to the assignee of the present invention, teaches time domain processing of vibration signals for monitoring rotating gears. Specifically, a high resolution clock for controlling the sampling of accelerometer signals is formed by linearly interpolating the intervals between the times of gear teeth of a rotating gear passing a sensor. The present invention is an improvement over this method because it preserves valuable modulations of the signals without introducing spurious high frequency signal components into the analysis.

U.S. Pat. No. 4,488,240 teaches linear interpolation of a tachometer signal similar to the method of U.S. Pat. No. 4,931,949. The method controls sampling of accelerometer signals from aircraft engines enabling synchronous averaging of vibration over a range of speeds to detect imbalance at the frequency of engine rotation. This method has the undesirable effects of eliminating the analytically valuable phase information in the FM sidebands of the signal while allowing aliasing artifacts in its preferred embodiment. The present invention overcomes these defects by using a dynamic, non-uniform signal known as the "speed clock." The speed dock prevents aliasing problems at frequencies of interest while also preserving the desirable FM modulations of the signal.

The Succi reference teaches frequency domain technology for analyzing helicopter gearbox vibration. Succi, George P., Synchronous Averaging of Multiple Gear Shafts Using an Interpolating Filter, Proceedings of the 49th Meeting of the Society for Machinery Failure Prevention Technology, Vibration Institute (1995). This method destroys FM modulations and has the further drawback of relying on expensive, specialized high speed hardware to sample an encoder signal. The encoder attached to a shaft has a single element that is detected once per revolution. Regardless of sampling rate, the method is prone to aliasing artifacts associated with turning speed modulations greater than half the shaft turning rate. The present invention clearly offers a superior solution which avoids aliasing artifacts and preserves FM modulations, while using common, inexpensive sampling hardware.

U.S. patent application Ser. No. 08/045,604, assigned to the same assignee as the present invention (issue fee paid), teaches frequency domain methods for producing coherent vibration spectra for diagnosing defects within rolling element bearings. This method uses unprocessed encoder signals to control initial sampling of an accelerometer signal but the encoder signal is not processed. Coherence in the vibration spectra is established between elements of the bearing by further processing in the spectral domain. The present invention differs because time domain processing technology creates an enhanced encoder signal. This enhanced signal is then used for resampling any machine signal in a manner that prevents artifacts in the processing results.

U.S. patent application Ser. No. 08/1290,375, assigned to the same assignee as the present invention (issue fee paid), teaches using a speed clock to process tachometer signals to detect torsional resonances in turbine rotors. Frequency changes in the torsional resonances are used to detect mechanical changes in the rigidly assembled shafts, disks and blades that comprise a rotor. The method processes only encoder signals, not vibration or other signals. Nor does it detect changes in non-rotor components such as gears and bearings. Neither does it enable error-free processing for components turning at a variety of speeds, as in a complex gearbox. The present invention clearly differs from that prior work in processing other sensor signals and detecting changes in non-rotor components turning at various speeds in a complex machine.

SUMMARY OF THE INVENTION

Briefly described, the present invention consists of a method and device for processing machine signals that provides improved monitoring of the condition and performance of operating machines. It removes dominant masking signal components and it prevents artifacts that can mask or be mistaken for diagnostically important signal components. Artifact refers to an spurious signal component introduced in acquiring or processing a signal. By preventing artifacts while retaining critical phase information, the present invention provides a result with a dynamic range and frequency resolution unattainable by other technology known to the inventor.

Leakage is a mathematical artifact of FFT processing wherein spectral energy appears at frequencies where it does not appear in the actual signal. Leakage appears as skirts sloping away from the peaks in a spectrum and until now has limited dynamic range in all processing techniques that retain diagnostically important phase information, or FM signal components. RPM smear is the spreading of frequency peaks caused by processing that fails to compensate for the unsteady turning speed experienced with all operating machinery.

The present invention processes a quasi-periodic signal, from a tachometer or encoder in the preferred embodiment. This processing yields a dynamic non-uniform signal called a "speed clock" to control processing of various machine signals. Quasi-periodic refers here to a signal having one or more frequency components that do not vary significantly from one cycle to the next, but may do so over longer time periods.

In forming the speed clock, the present invention processes the times when the encoder signal has zero amplitude (zero crossing times) to produce a new series of times called resampling times which comprise the speed clock. The zero crossing times are considered by convention to occur at integer index locations, e.g. one, two, three. The speed clock, however, typically will include resampling times at non-integer index locations, e.g. index two-sevenths, index four-thirds, as the basis for artifact-free processing of certain signal components.

Processing under speed clock control selectively removes dominant signal components, such as harmonics of shaft rotation rate, that are not of analytic interest without otherwise altering the signal. A speed dock is formed based on the dominant signal component to be removed. Processing that signal with that speed clock prevents leakage and RPM smear of that component and its harmonics. Being free of leakage and smear, the component(s) can then be removed to reveal diagnostically significant signal components that previously were hidden. Speed clock processing and removing of selected signal components can be repeated a number of times to remove multiple components and can be practiced for fixed or variable speed machines.

The signal processing improvements in the present invention dramatically increase spectral sensitivity and resolution in the processing of the quasi-periodic machine signals which, in turn, significantly improves detection of a large variety of problems, such as cracking, chipping, pitting, spalling, rubbing, runout, and roar in gears and bearings in complex operating machines that are otherwise beyond the reach of monitoring.

The above device and method can be more clearly be understood with reference to the following figures.

DETAILED DESCRIPTION OF THE PREFERRED EMBODIMENT

During the course of this description like numbers will be used to identify like elements according to the different figures that illustrate the invention.

The present invention is a method and device 100 for processing quasi-periodic signals from machines 200 which prevents artifacts and removes undesirable signal components without otherwise altering the signals. A speed clock comprised of resampling times is generated and used to control resampling of signals by interpolation. Resampling dramatically improves the signal for subsequent processing with a vast array of periodic techniques from such disciplines as acoustics, telecommunications and related fields. In preparing the signals for subsequent processing, the present invention dramatically enhances sensitivity and resolution in the final analytical result. The invention treats time as a dependent variable in some steps, using digital signal processing techniques normally applied to physical signals as time-dependent functions.

Figure 1:
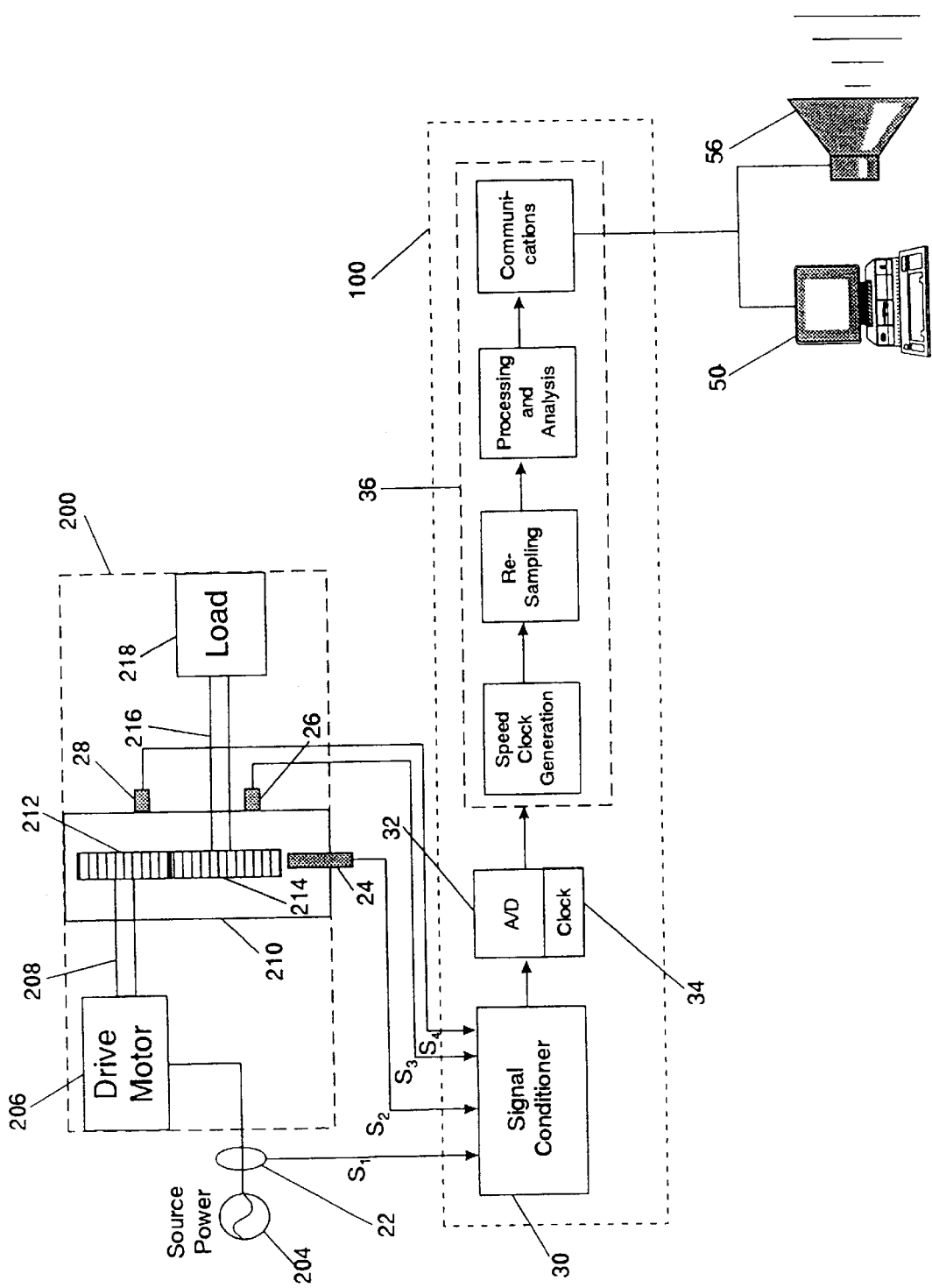
FIG. 1 illustrates the present invention acquiring and analyzing signals from a rotating machine according to the preferred embodiment.

FIG. 1 illustrates the invention 100 monitoring a rotating machine 200 having an electric power source 204 supplying a motor 206 driving an input shaft 208 of a gear box 210, which has at least two meshing gears known as the input gear 212 and the output gear 214, and an output shaft 216 which drives a load 218.

Signals are acquired from the machine 200 using appropriate means, such as Hall-effect or other electric sensors 22, shaft encoder sensors 24, vibration sensors 26 and temperature sensors 28. An encoder sensor 24 may be a magnetic detector of gear teeth on a turning gear 214 or other sensor providing a signal with a plurality of cycles or pulses per rotation. Vibration sensors 26 include common types in addition to pressure, or acoustic sensors of appropriate bandwidth and sensitivity. Temperature sensors 28 can include optical means of non-contact sensing.

Sensor signals, shown as $S_1$, $S_2$, $S_3$, $S_4$ in FIG. 1, are amplified and subjected to anti-alias filtering and amplifying with analog signal conditioning means 30, such as a commercially available signal conditioning PC board. The conditioned signals are then transferred to a commercially available analog-to-digital (AID) converter 32 . The A/D converter 32 samples the conditioned signals at a sampling rate determined by computer clock 34.

Sampling by the A/ND converter 32 produces a digital signal representing each sensor signal. Digital signals are transferred to a commercially available digital signal processor (DSP) 36 board, which temporarily stores portions of the digital signals, generates the speed clock described below, resamples the temporarily stored digital signals, and processes and analyzes the resampled signals.

A speed clock is formed around a selected quasi-periodic frequency component of interest of a sensor signal. In the preferred embodiment, this frequency component is the carrier frequency of the encoder signal (the "encoder carrier"). Once formed, the speed clock is used to control resampling and processing of digital signals from the machine 200. The resampled digital signals are termed speed clocked data.

Figure 2:
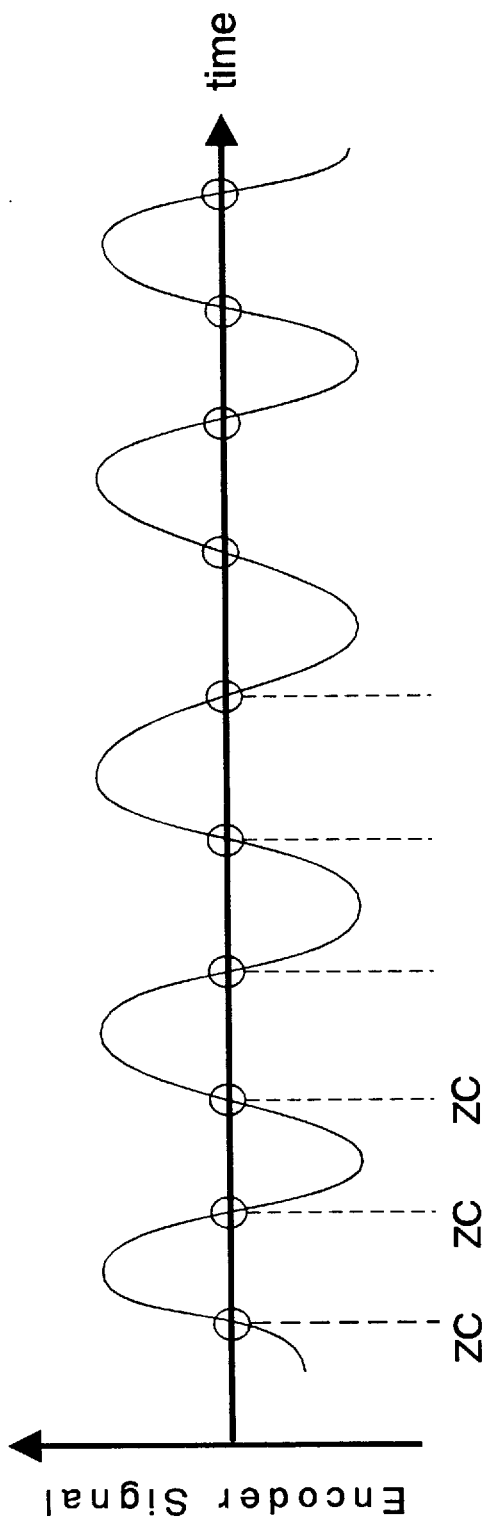
FIG. 2 illustrates an encoder signal and its zero crossing (ZC) time values.

FIG. 2 illustrates the analog trace of an encoder signal following band pass filtering. The encoder signal here has zero amplitude twice per cycle. These times, which are termed zero crossing times (ZC), are determined primarily by the encoder carrier frequency. As a result, an encoder signal may appear to the naked eye to be a simple sine wave. Its spectral composition, however, is typically rather complex.

Figure 3:
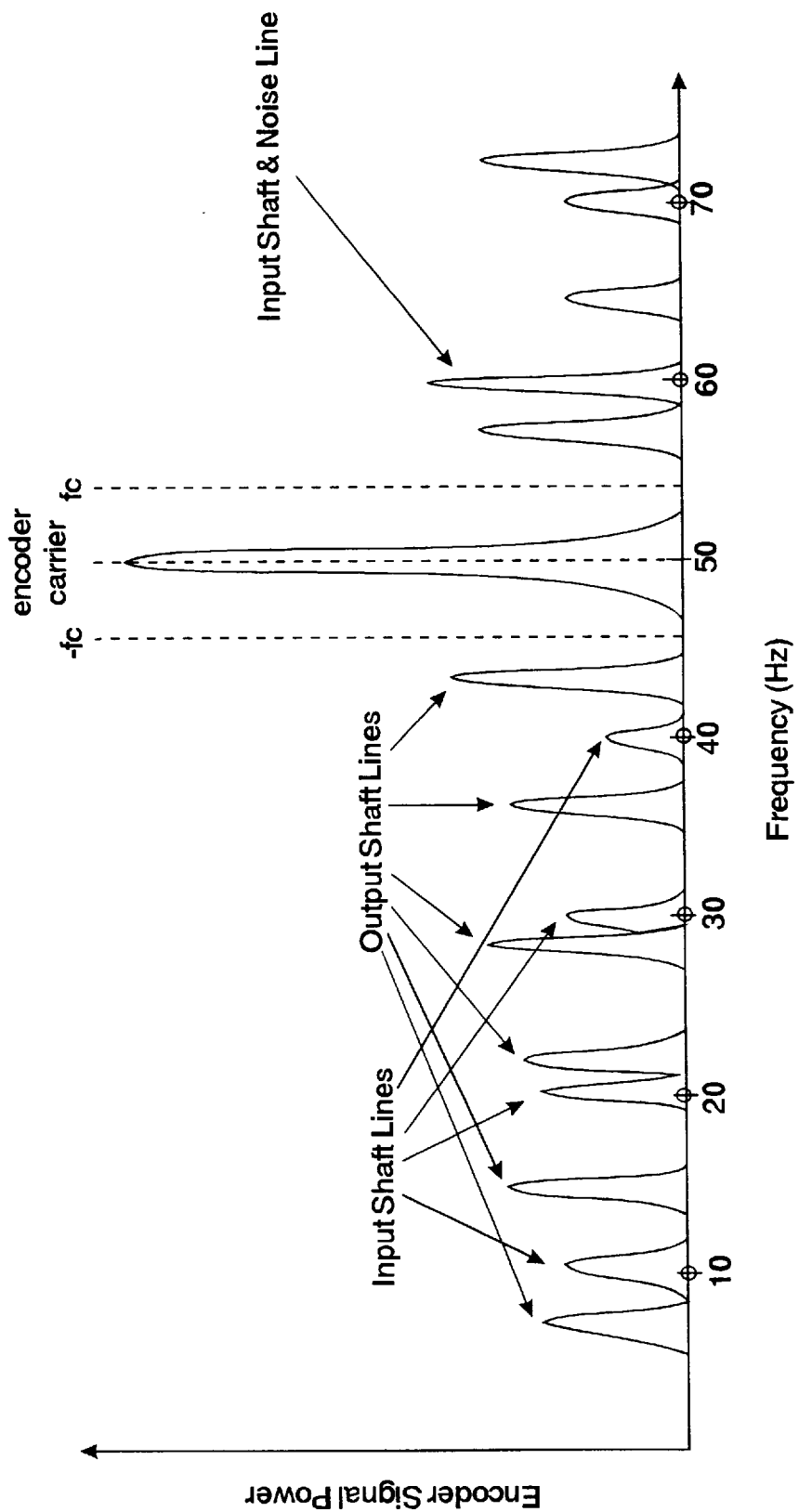
FIG. 3 illustrates the encoder signal spectral composition for an essentially constant speed machine.

FIG. 3 illustrates a spectrum of an encoder signal (the "encoder spectrum") for a machine having an input gear 212 and an output gear 214 with 5 and 7 teeth respectively. Gear meshing couples the rotations of the input shaft 208 and output shaft 216. The gear tooth ratio of the meshing gears determines the relative rotation rates of the input shaft 208 and the output shaft 216. If the rotation rate of the input shaft 208 is 10 Hz, the rotation rate of the output shaft 216 is 50/7 Hz. The carrier frequency of the encoder signal (the "encoder carrier"), is 50 Hz, the rate at which teeth on the output gear 214 pass the encoder sensor 24. The encoder carrier is digitally filtered with cut off frequencies $f_c$, and $-f_c$ with respect to the encoder carrier frequency.

Other components in the illustrative encoder spectrum are FM and AM effects at harmonics of the turning speeds of the input shaft 208 and output shaft 216. These components are produced primarily by imperfections in the detected output gear 214 or once per turn effects of the input shaft 208 and the output shaft 216. The spectrum component at 60 Hz consists of both electrical noise and the first harmonic of the 10 Hz rotation rate of the input shaft 208. The speed clock in this case is formed around the encoder carrier at 50 Hz (the "clock frequency").

Figure 4:
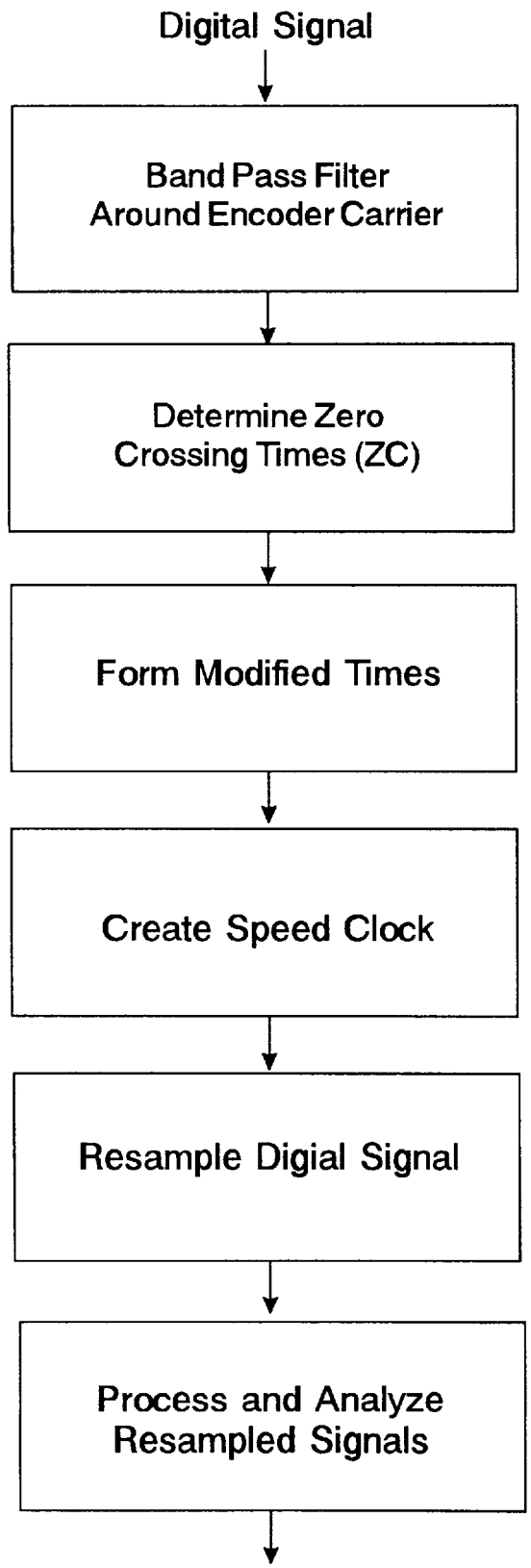
FIG. 4 outlines the processing steps for generating a speed clock.

FIG. 4 outlines the steps of forming the speed clock. In step 1, the digital encoder signal is band pass filtered with a pass band centered around the clock frequency. The width of the pass band typically is less than the magnitude of the clock frequency. This step, which is accomplished by standard methods of digital filtering, isolates one harmonic of the encoder carrier and its sidebands from other signal components.

In step 2, the band-pass-filtered signal is interpolated to determine its zero crossing times. The twice per cycle frequency of the zero crossing times establishes a Nyquist frequency equal to the encoder carrier frequency because the zero crossing times represent two samples per cycle. As a result, a speed clock formed by processing only the zero crossing times is equivalent in its frequency composition to that of a more densely sampled signal. Processing only zero crossing times significantly reduces computational demands.

In step 3, the zero crossing times are low pass filtered at a cut off frequency typically between 0.1 and 10 Hz, with the retained frequency components determining spacing of the filtered zero crossing times. Resampling a digital signal at times based on the filtered zero crossing times produces a resampled signal that retains the higher frequencies excluded from the filtered zero crossing times. The spectrum of such a resampled signal will, therefore, retain diagnostic signal components and phase information without the masking effects of the low frequency components.

Figure 5A:
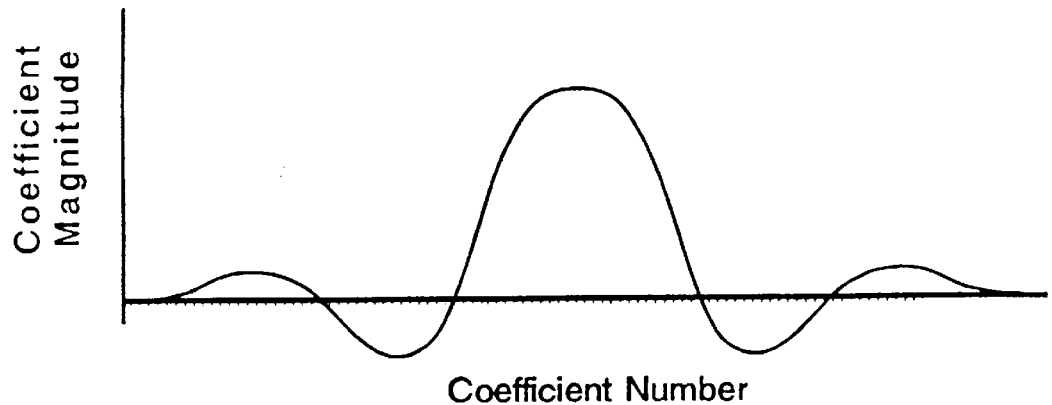
FIG. 5a illustrates the relative magnitude of the coefficients of the low pass filter in the time domain.
Figure 5B:
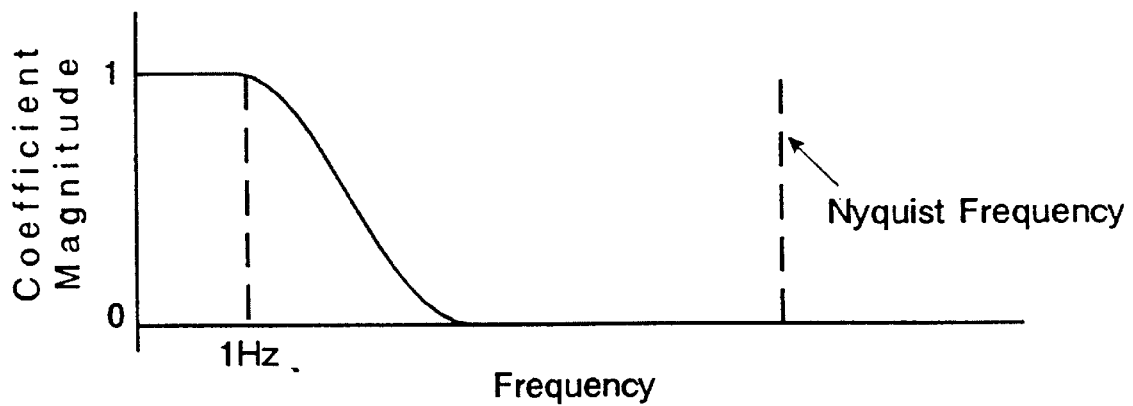
FIG. 5b illustrates the composition of the low pass filter in the frequency domain.

FIG. 5 illustrates a finite impulse response filter for low pass filtering the zero crossing times, shown in its time domain (5a) and frequency domain (5b) forms. The filter has a low ripple pass band, a steep roll off, and a stop band typically below 100 dB. The results of low pass filtering the zero crossing times are termed modified times.

Figure 6A:
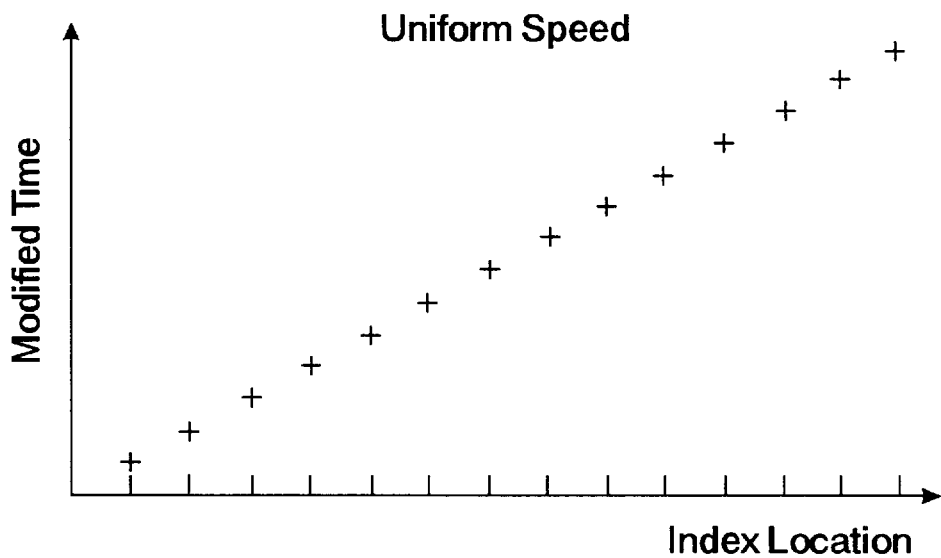
FIG. 6a illustrates the modified times produced by low pass filtering an encoder signal from a uniformly rotating machine.
Figure 6B:
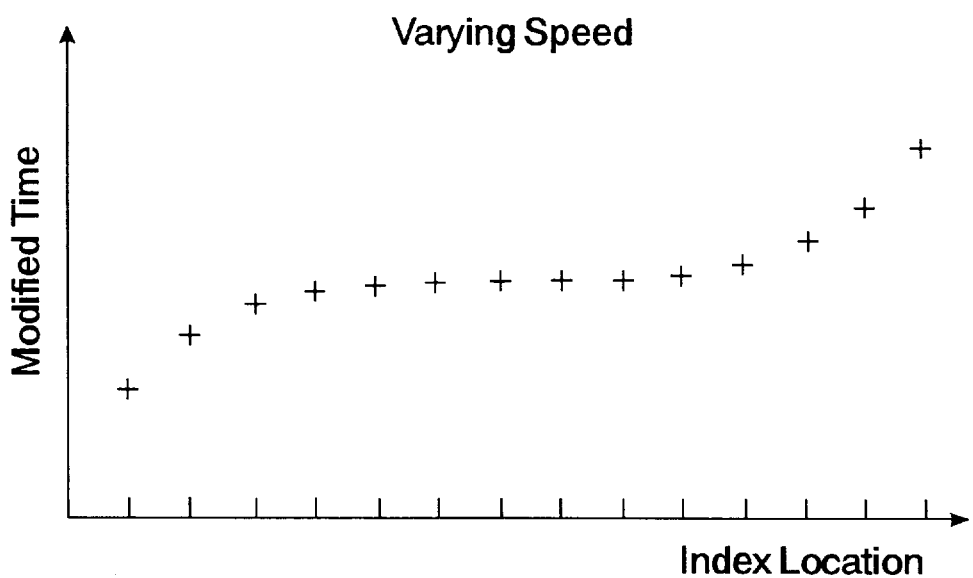
FIG. 6b illustrates the modified times produced by low pass filtering an encoder signal from a non-uniformly rotating machine.

FIGS. 6a–6b illustrate the spacing of the modified times for uniform (periodic) rotation (FIG 6a) and for slowly varying (quasi-periodic) rotation (FIG. 6b) of a machine 200. With uniform rotation, the encoder carrier is periodic and the modified times are uniformly spaced, being the same as the zero crossing times. For non-uniform rotation, the modified times are unevenly spaced.

In step 4, the density of modified times is adjusted by a process referred to as "clock increasing and decimating" to yield a speed clock composed of resampling times that satisfy the Nyquist criterion for frequencies of interest and that provide an integer number of resampling times per period of interest, most commonly the encoder turning period. Resampling under control of such a speed clock prevents leakage around the harmonics of turning speed without destroying other critical sideband information. The result is retention of diagnostically important frequency components with dramatically increased precision, sensitivity and resolution in all subsequent analytical steps.

Resampling can be synchronized to any machine period with a fixed relationship to the encoder turning period by appropriate magnitudes of clock increasing and decimating in step 4. To process signals with respect to a secondary machine component that is turning three-fourths as fast as the encoder, the speed clock is adjusted to make resampling times three-fourths as frequent as in an encoder-based speed clock. The result is an integer number of resampling times for each rotation of the secondary component, which prevents leakage and smearing around the harmonics of its turning speed.

Figure 7A:
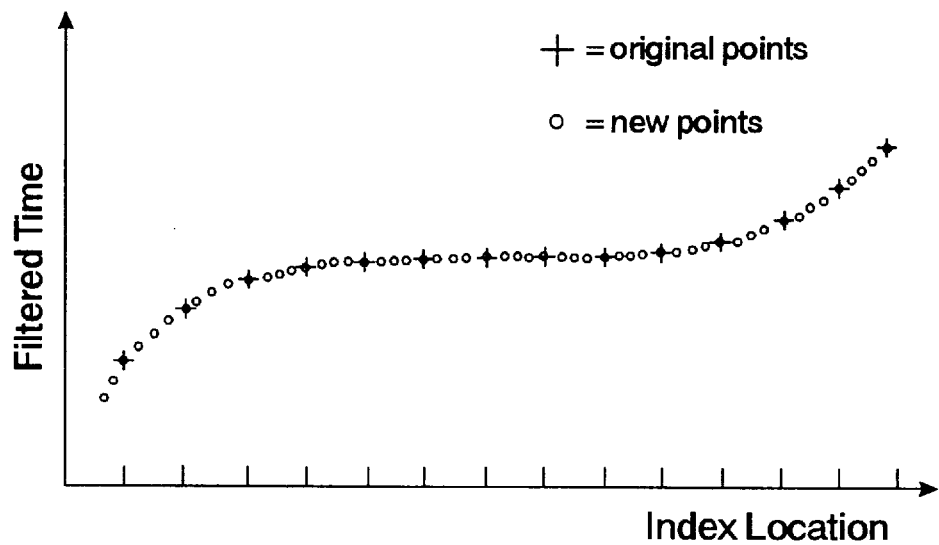
FIG. 7a illustrates the set of resampling times of the speed dock created by the steps of clock increasing and decimating steps.
Figure 7B:
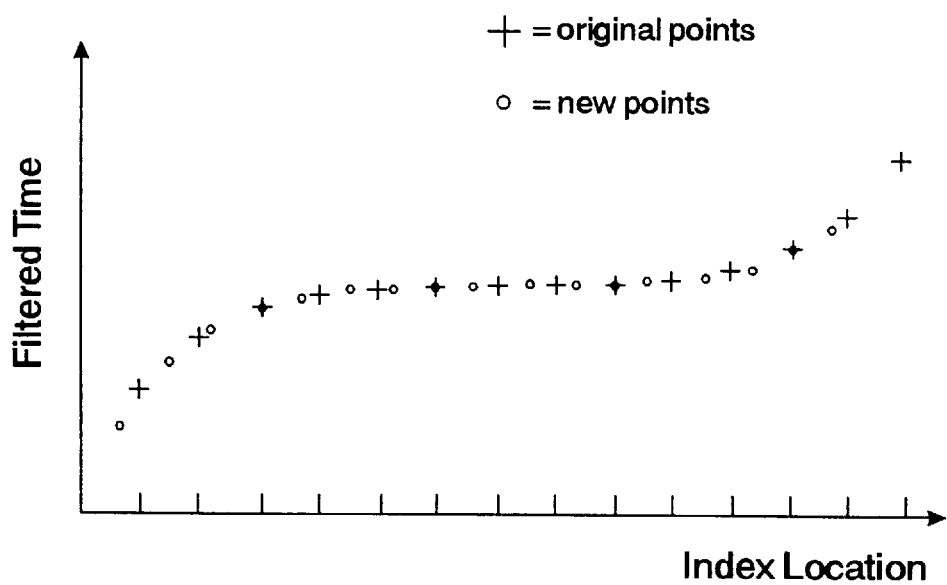
FIG. 7b illustrates further modification of temporal density of the resampling times by three-fold decimating, which removes 3 of every 4 of the increased set of times.

FIGS. 7a–7b illustrate clock increasing and decimating steps in creating a speed clock for a non-uniformly rotating machines. In FIG. 7a, a clock increasing by a factor of four yields four times as many resampling times per encoder rotation. In FIG. 7b, temporal density of the resampling times is further modified by three-fold decimating, which removes 3 of every 4 of the increased set of times. Clock increasing and decimating in this example are designed to produce a speed clock with one third more resampling times per encoder rotation. By using a speed clock with this spacing, resampling produces speed clocked data without leakage artifacts around turning speed harmonics of a machine component turning at ¾ times the encoder turning rate. This adjustment of the speed clock to a different speed enables such a signal even when an encoder signal does not exist for the slower turning component. Such a speed clock can be used, for example, to remove leakage associated with a reduction gear deep within a helicopter gearbox.

FIGS. 8a–8d illustrate a multi-step means of clock increasing that improves precision of the speed clock by preventing cumulative error. While any clock may have a constant precision, its systematic error will accumulate over time. For example, a clock that is slow by 1 part in 86,400 will loose a second per day and more than 6 minutes in a year. The steps in FIG. 8a through 8d are designed to eliminate such cumulative error in the speed clock. The actions are mathematical steps represented by operations involving a graphical time function with the magnitude of modified time along the ordinate (Y-directed axis) and the index number or location along the abscissa (X-directed axis).

Figure 8:
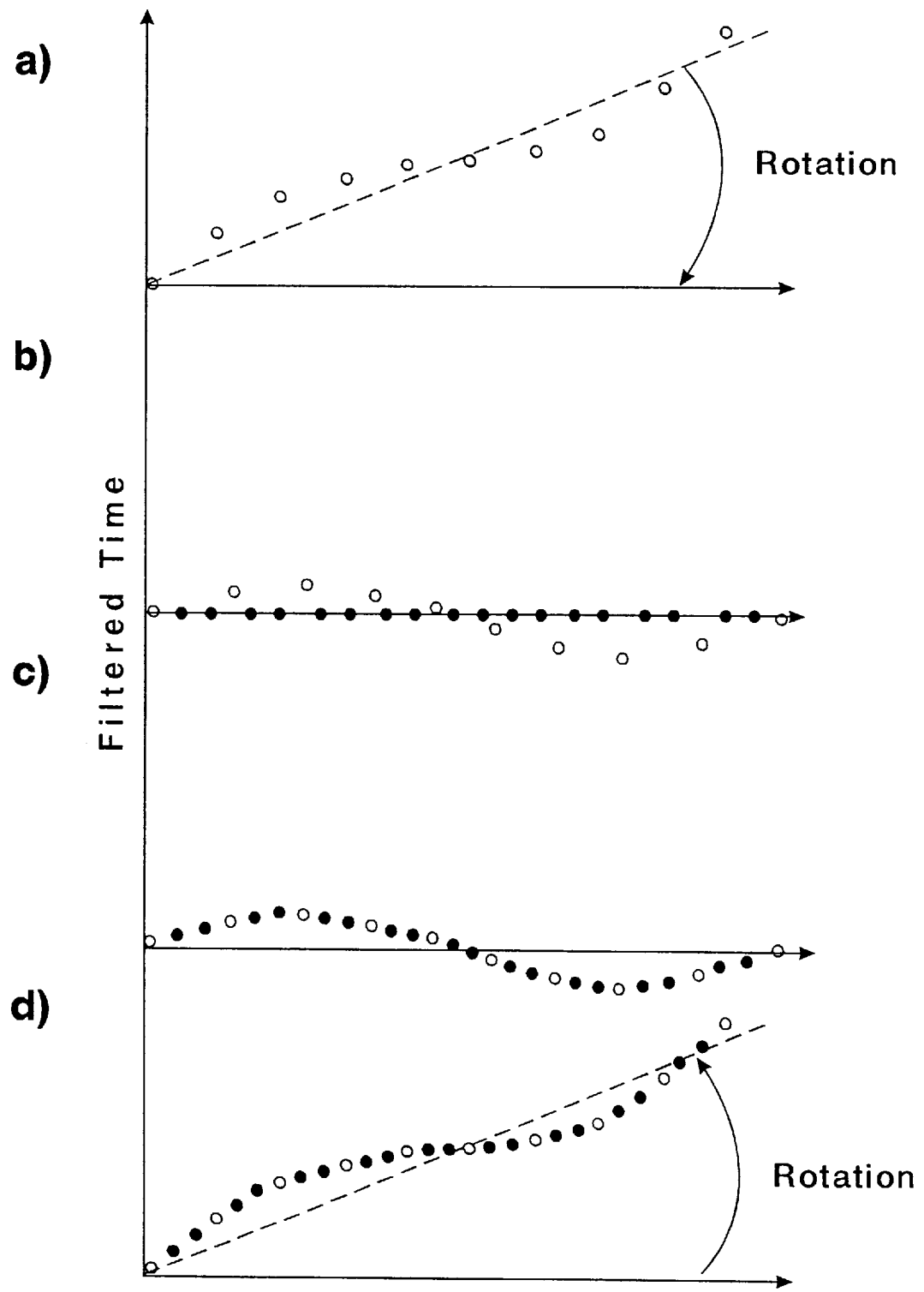
FIGS. 8a–8d illustrate the individual mathematical steps comprising clock increasing.

The modified times function is first rotated to the abscissa (FIG. 8a) to remove the linear component of increase in time between succeeding values, retaining only the variable portions of the values. Next, an integer number of equally spaced new zero times are interposed at index locations between those of each pair of rotated modified times (FIG. 8b). The set of rotated modified times and interposed new zero times is then low pass filtered to adjust the new zero times by introducing the appropriate variable component for each and creating a filtered set of times (FIG. 8c). The filtered set of times is then is rotated back to the initial orientation of the modified times (FIG. 8d) by adding to each value the appropriate magnitude of linear increase in time. The result of these operations is a dense set of filtered times having the same frequency composition as the original modified times but with a higher density and without the cumulative error that is introduced by standard techniques. Next, an appropriate degree of decimating selectively removes elements of the filtered set and produces a speed clock with the desired spacing of its resampling times.

Figure 9:
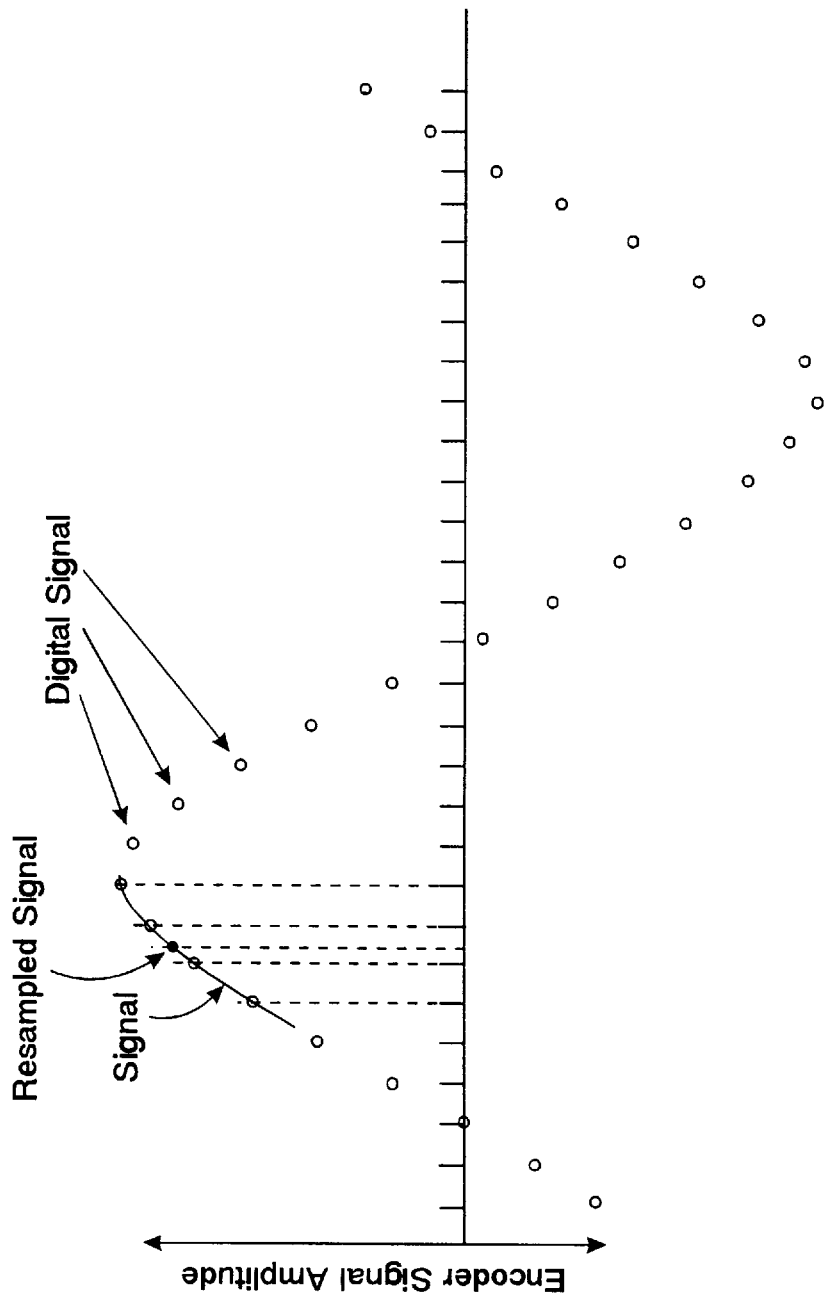
FIG. 9 illustrates the step of resampling by interpolating.

The modified times and the filtered set of times satisfy the Nyquist criterion for all frequencies in the low pass filter. As a result, a continuous mathematical function exists for the encoder signal $S_2$ that has real values at any real valued index location. The resampling times comprising the speed clocked data are, therefore, defined in all cases. FIG. 9 illustrates the next step, resampling by interpolating the temporarily stored values of the initial digital signals. Resampled values are interpolated at each of the resampling times comprising a speed dock. Typically a linear filter, such as a truncated Shannon filter, is used although a filter of polynomial or other form may be used as an alternative. Filter coefficients preferably are determined by least squares estimator techniques, which minimize error in fitting the filter to the digital signal. Typically, the interpolator employs a fixed number of samples from the original digital signal before and after each resampling time.

It is often desirable to remove leakage-free synchronous signal components, which may be accomplished by a number of means. One method is phase lagged subtraction, wherein a data record is subtracted from itself with a phase lag equal to the synchronizing period. Removing large components from a signal typically yields a dramatic increase in spectral sensitivity and extracts otherwise undetectable components of significant diagnostic value.

After removing synchronized components, speed clocked data may be further processed to advantage by synchronizing to and removing additional signal components, using appropriately constructed speed docks. For example, speed clocks for processing vibration data from a gearbox can be formed around the turning speed and electrical power frequency components of the signal and applied sequentially to a digital vibration signal. These steps of speed clock processing first remove masking effects of turning speed harmonics and then of line frequency components. The net result is a spectrum with dramatically enhanced extraction, sensitivity and resolution for detecting signal components of interest.

Resampling under speed clock control prevents leakage around turning speed harmonics without destroying critical phase information by contrast with methods that either suffer from masking leakage or from destruction of phase information. The combined effect of eliminating leakage and retaining phase information makes the current invention superior in analyzing complex vibrations, such as from helicopter gearboxes.

In applications to equipment designed to operate at variable speed, the encoder carrier frequency may vary significantly and create significant artifacts. As a result, the band pass filter used to create the speed clock for variable speed applications, a "variable speed clock," is used. The variable speed clock tracks and selectively damps, rather than restricts the magnitude of the change in the encoder carrier frequency. In this, the tracking band pass filter resembles a stationary filter in including only the relatively low frequency modulations of encoder carrier that is being tracked. As such, it rejects rapid transients but tracks the encoder carrier over arbitrarily large ranges in frequency.

Processing under control of a variable speed clock may be practiced along with other speed clock processing steps. For example, a clock based on electric line frequency can be used in eliminating spectral components due to electrical effects in a variable speed motor, either before or after resampling under control of a variable speed clock to remove the masking effects of leakage and smear of harmonics of shaft turning speed.

Smearing, which is spurious broadening of spectral peaks such as vibrational resonances, is caused by the changing sampling rate of a variable speed clock. The smearing reflects apparent frequency changes in the signal components of interest caused by compensation for changes in encoder carrier frequency. Being proportional to change in resampling frequency, smearing is most pronounced in variable speed applications and typically requires its elimination.

The prevention of smearing artifacts is accomplished by additional resampling under control of a constant clock termed a "wall clock." The wall clock is independent of the variations in encoder turning rate embodied in a speed clock. As a result, resampling under its control will remove smearing artifacts introduced by the speed clock. Once smearing artifacts are removed, further processing is possible with a wide range of techniques developed for periodic signals. Wall clock resampling may also be used to provide high resolution for constant speed equipment as well.

Machine components with coupled rotations may be beneficially analyzed by hunting tooth technology incorporating speed clock processing. Hunting tooth processing relies on the fact the coupled components have turning periods that have fixed relationships among them even if their magnitudes all differ. A hunting tooth period is the ensemble period for the coupled components. This period is the time required for all coupled components to rotate at least once and return to their initial angular positions. Resampling under control of a speed clock with an integer number of resampling times per hunting tooth period prevents smearing and leakage around the harmonics of the turning speeds of all the coupled components. In addition, data records that are an integer multiple of the hunting tooth period can be averaged to enhance signal components that are periodic with respect to the hunting tooth period, while canceling those that are not.

Figure 10:
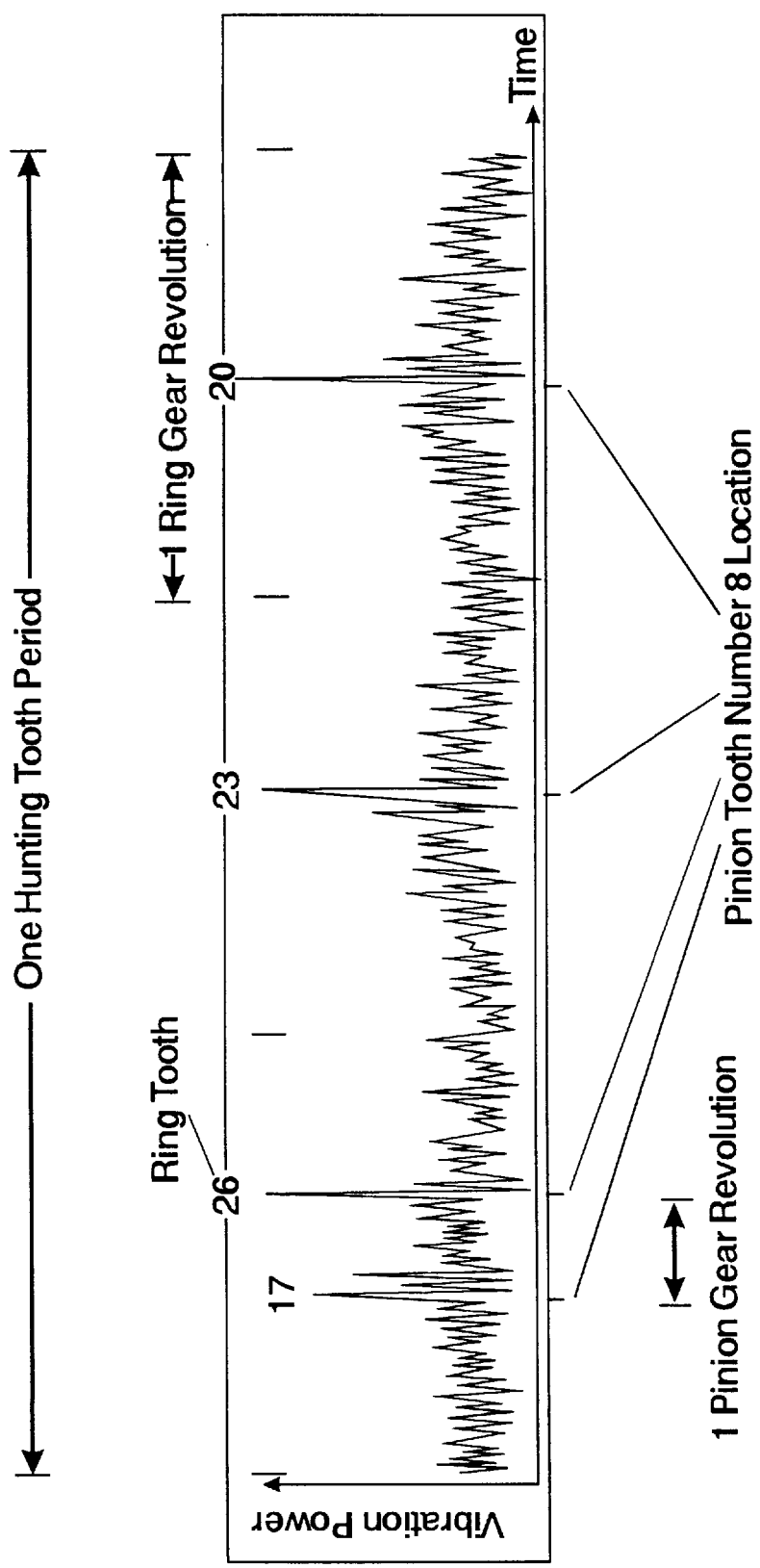
FIG. 10 illustrates results of hunting tooth processing for two intermeshing gears.

FIG. 10 is an averaged spectrum for data records with an integer number of resamples per hunting tooth period for a gearbox 210 having an input gear 212 having 39 teeth and an output gear 214 having 9 teeth. The hunting tooth period is the time required for 117 tooth meshing events. If the rotation period of the output gear 214 is 1 second, the rotation period of the input gear 212 is 39/9 seconds and the hunting tooth period is 13 seconds. The figure shows clearly the components associated with each gear.

Averaging subrecords formed by appropriately subdividing hunting tooth records isolates signal components associated with the 39 tooth gear or the 9 tooth gear. Averaging subrecords 39/117 times hunting tooth record length isolates signal components associated with the 9 tooth gear. The signal component associated with the eight tooth of the 9 tooth gear has an abnormal pattern, suggesting a possible defect with that tooth.

On completion of the various steps of speed clock processing, the speed clocked data are processed with a variety of time-domain and frequency-domain methods. In the case of averaging, the data records are formed with a constant, integer number of resamples. If processing includes fast Fourier transformations, data record lengths are further constrained to $2^p$, resamples, where p is also an integer.

Following frequency domain transformation, speed clocked data may be subjected to side band algebra to remove undesired signal components, including amplitude modulation (AM) noise. For this, a digital signal is band pass filtered to form a band passed signal with a band width extending over two harmonics of the carrier and their associated sidebands. The band passed signal is used to form two digital subsignals, with each subsignal consisting of one carrier harmonic and its sidebands. The lower sideband and the complex conjugate of the upper sideband of one subsignal are added to form a combined lower sideband. The process is repeated with the upper sideband and the complex conjugate of the lower sideband of the other subsignal to form a combined upper sideband. The combined upper and lower sidebands are then multiplied to produce an amplitude modulation free signal, without otherwise altering the signal.

Speed clock control of sampling, resampling or signal processing can be conducted in the inventive device 100, in external devices 50 following output of the Speed Clock signal, or internally using a Speed Clock input from an external device 50. External applications of the speed clock might include diagnosing generator faults, controlling variable speed motors and processing of vibrations from complex coupled devices such as the gearbox in a multiple drive axle vehicle.

In summary, the present invention provides a number of advantages. First, it prevents spectral leakage around signal components of interest, such as the harmonics of shaft turning speed. It also applies to the harmonics of other components that are turning at differing speeds and other signals e.g. removing electrical effects in vibration signals. Second, it prevents RPM smearing, which provides extremely high frequency resolution. Third, it accomplishes these objectives for variable and constant speed machines. Fourth, it accomplishes its objectives while retaining diagnostically important phase information in the signal and without introducing other analytical artifacts.

While the invention has been described with reference to the preferred embodiment thereof, this description is not intended to be limiting. It will be appreciated by those of ordinary skill in the art that modifications can be made to the structure and elements of the invention without departing from the spirit and scope of the invention as a whole.

I claim:

1. A method for capturing and analyzing machine signals having at least one quasi-periodic signal component, comprising the steps of:
    a) placing at least one sensor on a machine;
    b) obtaining initial machine signal data from said at least one sensor;
    c) conditioning said initial machine signal data to remove aliasing components and produce conditioned signal data;
    d) digitizing said conditioned signal data to produce uniformly sampled data;
    e) processing said uniformly sampled data to produce modified machine signal data having a non-uniform sampling rate proportional in frequency to said quasi-periodic signal component, the rate of change of which is less than a cutoff value; and
    f) analyzing said modified machine signal data for the purpose of determining the operating condition and performance of the machine.

2. The method of claim 1 wherein said processing step further comprises the steps of:
    g) deriving a second signal from said digitized signal data wherein said second signal has a quasi-periodic frequency component that varies with time;
    h) extracting from said second signal an array of discrete time points having a frequency variation less than said cut-off value;
    i) generating from said array of discrete time points a speed clock array which satisfies Nyquist sampling requirements; and
    j) resampling said digitized signal data under control of said speed clock array to produce said modified machine signal data.

3. The method of claim 2 wherein said at least one sensor includes at least one shaft encoder.

4. The method of claim 3 wherein said second signal derives from said at least one shaft encoder producing a plurality of pulses per turn of said shaft encoder.

5. The method of claim 4 wherein said extracting step further comprises the steps of:
    k) determining zero crossing points when said second signal has zero amplitude; and
    l) low pass filtering said zero crossing points to produce said modified discrete time points.

6. The method of claim 5 wherein said generating further comprises the steps of:
    m) interposing a plurality of filtered time points into said modified discrete time points to produce a set of filtered time points; and
    n) selectively removing a subset of said set of filtered time points to produce said speed clock array.

7. The method of claim 6 wherein said resampling further comprises the step of:
    o) interpolating said digitized signal data to produce resampled data corresponding to said speed clock array.

8. The method of claim 7 wherein said interpolating utilizes a finite Shannon interpolator.

9. The method of claim 8 wherein said interposing further comprises the steps of:
    p) performing mathematical rotation operations to remove linear increases from said modified discrete time points such that the average value of said modified discrete time points becomes zero;
    q) entering an integer number of zero values of time at non integer index locations between each pair of said modified discrete time points to produce a second set of zero crossing points and said modified discrete time points;
    r) low pass filtering said second set of zero crossing points to produce said set of filtered time points; and
    s) adding a magnitude of time corresponding to said linear increase to each element of said set of filtered time points.

10. The method of claim 9 wherein said resampled data are formed into data records of fixed length corresponding to specific frequencies.

11. The method of claim 10 wherein said specific frequencies are removed from said resampled data to produce modified resampled data.

12. The method of claim 11 further comprising the steps of:
    t) repeating steps (g), (h), (l), and (j) to produce further modified machine signal data prior to said analyzing step.

13. The method of claim 12 wherein said specific frequencies are integer multiples of a specified shaft's frequency of rotation in said machine.

14. The method of claim 13 wherein said resampled data are formed into data records of fixed length corresponding to specific periods.

15. The method of claim 14 wherein said specific periods correspond to hunting tooth periods of said machine.

16. The method of claim 15 further comprising the step of:

u) resampling said resampled data using a clock array of non uniformly spaced time intervals wherein said non uniform spacing compensates for frequency effects such as centrifugal stiffening in turbine blades.

17. The method of claim 16 further comprising the steps of:

v) averaging successive data records to produce synchronously averaged results; and w) performing a Fourier transformation on said data records to provide frequency domain results.

18. The method of claim 5 wherein said extracting further comprises the steps of:

x) deriving said array of discrete time points by phase locked loop processing wherein a phased locked loop functions as a low pass filter having said cut-off frequency and said zero crossing points of said phase locked loop define said modified discrete time points.

19. The method of claim 6 wherein said speed clock array has an integer number of elements corresponding to each rotation of a machine component of interest.

20. The method of claim 19 wherein said integer number equals 2 to an integer power.

21. The method of claim 14 wherein said removing further comprises the step of:

y) creating a time delayed set of said modified resampled data corresponding to an integer multiple of said specific period; and z) subtracting said modified resampled data from said delayed modified resampled data.

22. The method of claim 21 further comprising the step of communicating said results to an operator.

23. A device for capturing and analyzing signals from machines comprising:

sensors placed about a machine for sensing machine signal data;

conditioning means for filtering out aliasing components in said machine signal data;

analog to digital conversion means for digitizing said conditioned signal data into digitized signal data;

processing means for processing said digitized signal data to produce modified machine signal data having a frequency sampling rate proportional to the frequency of said initial machine signal data wherein said sampling rate variation remains lower than a cut off frequency; and analysis means for analyzing said modified machine signal data for the purpose of determining the operating condition of the machine.

24. The device of claim 23 further comprising:

derivation means for deriving a second signal from said digitized signal data wherein said second signal has a quasi-periodic frequency component that varies with time;

extraction means for extracting from said second signal an array of discrete time points having a frequency variation less than said cut off frequency;

generation means for generating from said array of discrete time points a speed clock array comprised of modified discrete time points which satisfy Nyquist sampling requirements; and resampling means for resampling said digitized signal data using said speed clock array to produce said modified machine signal data.

* * * * *